Sept. 30, 1969  J. C. WHITESIDES  3,469,634
DIGGER-SHAKER INVERTER

Filed April 19, 1967  3 Sheets-Sheet 1

INVENTOR.
JACK C. WHITESIDES
BY Newton, Hopkins,
Jones & Ormsby
ATTORNEYS

Sept. 30, 1969   J. C. WHITESIDES   3,469,634
DIGGER-SHAKER INVERTER

Filed April 19, 1967   3 Sheets-Sheet 3

INVENTOR.
JACK C. WHITESIDES
BY Newton, Hopkins,
Jones & Ormsby
ATTORNEYS

United States Patent Office 3,469,634
Patented Sept. 30, 1969

3,469,634
DIGGER-SHAKER INVERTER
Jack C. Whitesides, Albany, Ga., assignor to Lilliston Implement Company, Albany, Ga., a corporation of Georgia
Filed Apr. 19, 1967, Ser. No. 631,981
Int. Cl. A01d 29/00, 17/00
U.S. Cl. 171—101      14 Claims

ABSTRACT OF THE DISCLOSURE

Digger, shaker and inverter apparatus for use in harvesting peanuts, wherein mature peanut laden plants are simultaneously removed from adjacent rows in the ground, elevated above the ground and shaken to remove the dirt from the plants, and deposited back on the ground in a single row, with the foliage adjacent the ground and the nuts above the ground so as to be exposed to sun and ambient air for drying purposes. A pair of plows remove the plants from the ground, a conveyor elevates and shakes the plants and deposits the plants on an inverting apparatus, and the inverting apparatus moves the plants in an arc, at first in the direction of movement of the plows and then to a point at the rear of the apparatus, whereat the plants are deposited upon the ground in inverted position.

BACKGROUND OF THE INVENTION

In harvesting peanuts, it is common practice to dig the peanuts from the earth, shake the dirt from the roots of the plants and stack the plants for drying. The machinery utilized to perform these basic functions currently comprise a plow powered by a tractor, a shaker including a conveyor thereon which lifts the plants from the ground and simultaneously elevates and shakes the plants to remove the dirt from the roots of the plants. When the plants leave the shaker frame, they are allowed to fall back to the earth where they are allowed to dry. When the plants are allowed to fall from the shaker, it is important that they fall to the ground foliage first; that is, so that the roots of the plants, including the nuts, are on top of the plant so that the sun and wind can function to dry the nuts. If the plants are deposited on the ground in this manner, they will dry quickly, without having to be turned or removed to a drying area. After the nuts have dried, the peanut laden vines can be gathered from the ground for picking the nuts from the vines.

SUMMARY OF THE INVENTION

This invention comprises a digger, shaker and inverter apparatus which functions to remove peanut laden plants from adjacent rows in a field, shake the dirt from the plants and deposit the plants from adjacent rows into a single row of inverted plants, that is, with the nuts up. The apparatus includes a pair of plows for digging the plants from adjacent rows of plants, a shaker for lifting the plants from the ground and shaking the dirt from the plants, and an inverting mechanism for catching the plants as they are dropped from the shaker and depositing the plants on the ground in an inverted position in a single row. The inverting mechanism includes a pair of counter-rotating spinner members constructed to rotate about vertical axes and positioned so as to catch the plants being dropped by the shaker and move the plants first in the direction of movement of the plows, and then through an arc to the rear of the apparatus where the plants are deposited upon the ground in inverted position.

Accordingly, it is an object of this invention to provide apparatus for digging plants from the earth, removing at least a portion of the dirt from the plants, and depositing the plants on the ground in an inverted position.

Another object of this invention is to provide an inverter mechanism in combination with a digger-shaker wherein the inverter mechanism functions to receive plants from the shaker and deposit the plants on the ground in an inverted position.

Another object of this invention is to provide apparatus for digging peanut laden plants from adjacent rows in the earth, picking up the plants from the adjacent rows and shaking the plants of the adjacent rows separately from each other, inverting the plants of the adjacent rows, and depositing the plants of the adjacent rows onto the ground in a single row in inverted position.

Another object of this invention is to provide a method of digging peanut laden plants from the ground from adjacent rows of plants, shaking the dirt from the roots of the plants, inverting the plants, and depositing the plants in a single row in an inverted position.

Another object of this invention is to provide a method of economically and expediently harvesting peanuts.

Other objects, features and advantages of the present invention will become apparent upon reading the following specification, taken in conjunction with the accompanying drawing wherein like characters of reference designate corresponding parts throughout the several views.

DESCRIPTION OF AN EMBODIMENT

Figure 1:
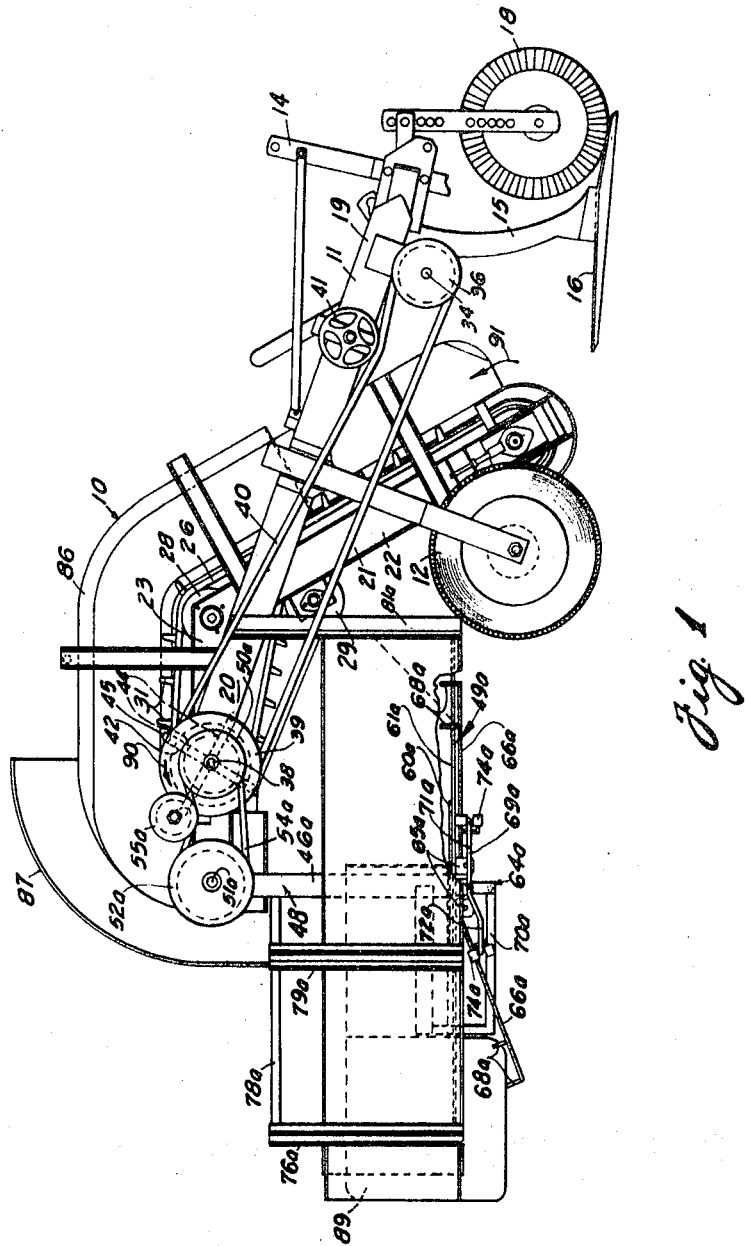
FIG. 1 is a side elevational view of the digger, shaker inverter.
Figure 2:
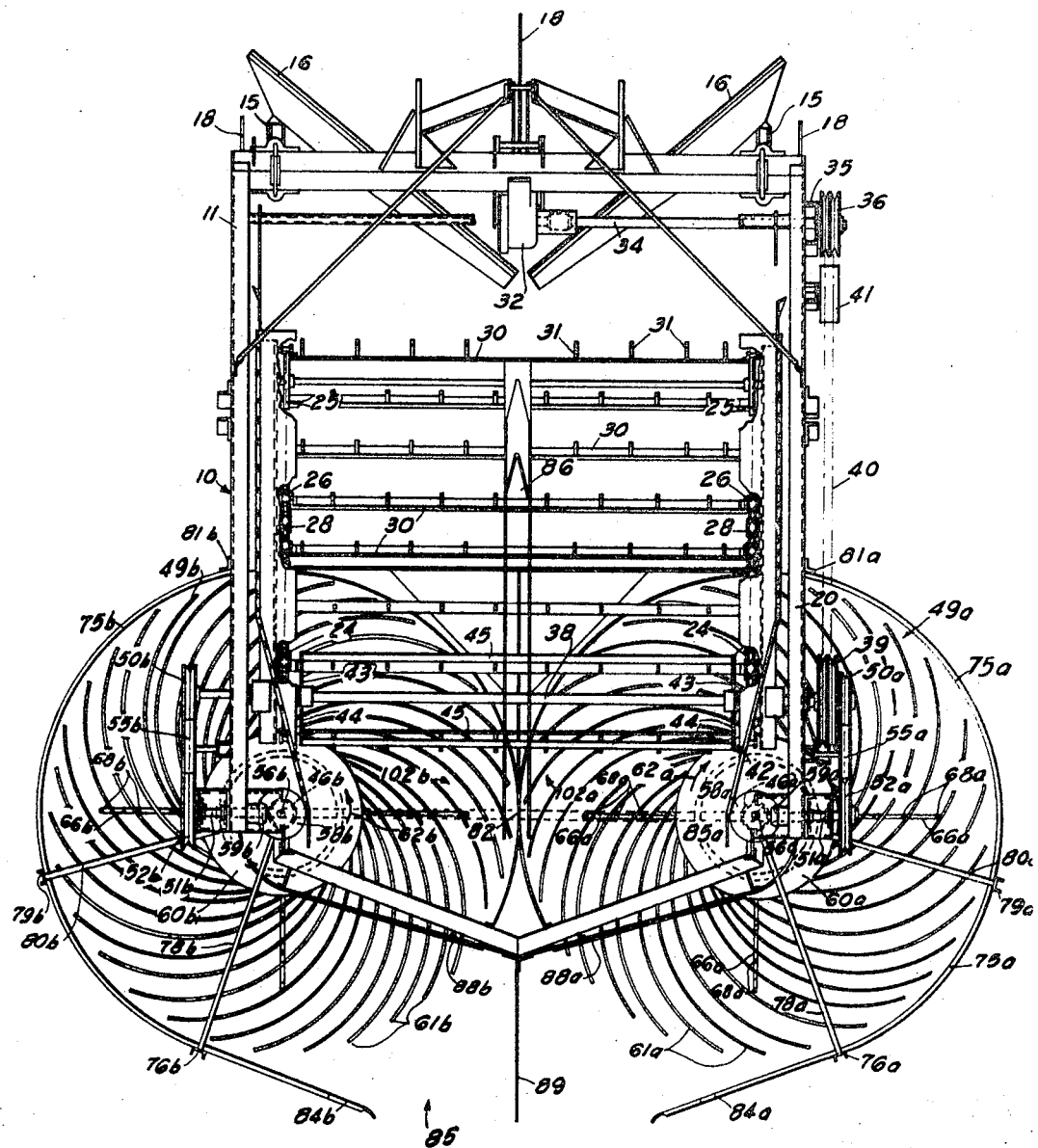
FIG. 2 is a top plan view of the digger, shaker inverter of FIG. 1, with the wheels and top cover removed therefrom.

Referring now more particularly to the drawing, FIG. 1 shows a digger, shaker inverter 10 which includes a frame 11 supported by wheels 12. A conventional three-point hitch 14 is mounted on the forward portion of frame 11 so that the frame and its related components can be towed by a tractor.

A pair of plow shanks 15 depend from the forward portion of frame 11, at each side thereof, and plows 16 are attached to the lower portion of shanks 15. Plows 16 are shaped to penetrate the earth and scoop peanut plants from the ground. Coulter blades 18 are attached to the forward portion of frame 11. Coulter blades 18 are positioned outwardly of, and slightly forwardly of, plows 16 and also intermediate plows 16 to penetrate the earth and cut the vines so that the plants will be removed from the earth in substantially individual rows of plants.

Frame 11 is normally tilted so that its forward end 19 is disposed lower than its rearward end 20, and an inner rattler frame 21 is supported by frame 11. Inner frame 21 is substantially in the shape of an inverted L and includes a downwardly and forwardly extending portion 22 and a rearwardly extending portion 23. Rearwardly extending portion 23 of inner frame 21 supports a pair of sprockets 24 inwardly and on each side thereof, while downwardly extending portion 22 supports sprockets 25 in a similar manner. Continuous chains 26 are positioned about sprockets 24 and 25, at each side of inner frame 21. A pair of upper flight guiding sprockets 28 are supported by inner frame 21, at the junction of rearwardly extending portion 23 and downwardly extending portion 22, while a pair of lower or return flight guiding sprockets 29 are supported by the downwardly extending portion 22 of inner frame 21, adjacent the junction of downwardly extending portion 22 and rearwardly extending portion 23. Chains 26 are placed over sprockets 28 and 29, as shown in FIG. 1.

A series of conveyor bars are connected at each of their ends to chains 26 and extend across the width of inner frame 21. Conveyor bars 30 each include a plurality of spikes or tines 31 spaced along their lengths which are constructed to extend in a direction normal to the path of travel of the conveyor bars 30, outwardly of the conveyor mechanism.

A transmission 32 is supported by frame 11, centrally of its forward end 19, and is adapted to be coupled with the power output of a tractor, or the like. Transmission 32 functions to rotate drive shaft 34 which is connected to frame 11 by bearing block 35. Sheaves 36 are connected to the end of drive shaft 34, outwardly of frame 11. Sprockets 24 mounted at the rearward end of frame 11 are connected to a common driven shaft 38 which extends through both inner frame 21 and frame 11. One end of driven shaft 38 has sheaves 39 connected thereto. Sheaves 39 are in alignment with sheaves 36, and an endless flexible belt 40 is mounted about sheaves 36 and 39 so that sheaves 36 function to drive sheaves 39. An idler roller 41 is rotatably connected to frame 11 and positioned to engage belt 40, to take up any slack that might exist in belt 40.

Driven shaft 38 of the conveyor mechanism supports doffing mechanism 42. Doffing mechanism 42 includes a pair of support spiders 43 connected to driven shaft 38 adjacent sprockets 24. Support spiders 43 each include a plurality of equally spaced radially extending arms 44. A plurality of doffing bars 45 extend between the outer ends of the arms 44 of support spiders 43. The radially extending arms 44 of support spiders 43 are of a length so that they extend beyond the periphery of sprockets 24, and support spiders 43 are oriented on driven shaft 38 so that arms 44 extend between conveyor bars 30. Thus, when the conveyor mechanism is operating, doffing bars 45 will protrude between and beyond adjacent conveyor bars 30 as they pass over driven shaft 38.

The rearward end 20 of frame 11 is angled toward the horizontal and supports at each of its sides a pair of generally vertically extending bearing sleeves 46a and 46b. Inverter mechanism 48 is connected to frame 11 by means of bearing sleeves 46a and 46b, and comprises a pair of spinners 49a and 49b. Inasmuch as spinners 49a and 49b and their related components are substantially identical, only spinner 49a and its related components will be described in detail.

Spinner drive sheave 50a is connected to driven shaft 38 of the conveyor mechanism. The rearward end 20 of frame 11 supports horizontally extending shaft 51a which has attached thereto, in alignment with spinner drive sheave 50a, spinner sheave 52a. An endless, flexible belt 54a is positioned about sheaves 50a and 52a. An idler roller 55a is rotatably supported by the rearward end 20 of frame 11 in a position to engage the outside surface of flexible belt 54a, to take up any slack that might exist in the belt. Spinner drive sheave 50a and spinner sheave 52a are variable pitch sheaves so that the speed of rotation of shaft 51a may be varied in relation to the speed of driven shaft 38.

Bearing sleeve 46a has rotatably mounted therein spinner drive shaft 56a. The upper end of spinner drive shaft 56a includes a beveled gear 58a which meshes with beveled gear 59a which is attached to the inner end of shaft 51a. Thus, rotation of sheaves 50a and 52a functions to rotate spinner drive shaft 56a. A disc 60a is rigidly connected to the lower end of spinner drive shaft 56a. A plurality of tines 61a are connected to the lower surface of disc 60a, and extend therefrom in equally spaced relationship. Disc 60a is constructed to rotate in the direction as indicated by arrow 62a and tines 61a are bent in the opposite direction; that is, the outer ends of tines 61a follow their inner ends in their direction of rotation.

Disappearing tine mechanism 64a is disposed below spinner 49a. Disappearing tine mechanism 64a includes a series of brackets 65a connected to the bottom surface of disc 60a, at 90° intervals about its center and tine support rods 66a are pivotally connected to the support brackets 65a. Upwardly extending tines 68a are connected to the outer ends of tine support rods 66a. Circular cam track 69a is supported beneath spinner drive shaft 56a by extension arm 70a, which in turn is supported from a stationary portion of the housing. Cam track 69a includes a lateral or flat section 71a and a dip or concave section 72a. Tine support rods 66a include cam followers 74a which follow the surface of cam track 69a. As is shown in FIG. 1, when disc 60a rotates, cam followers 74a will follow the periphery of cam track 69a to cause tine support rods 66a to extend, first laterally from beneath disc 60a when following the lateral or flat section 71a of cam tract 69a, and then in a lowered or dipped position, when following the dip section 72a of the cam track. When tine support rods 66a are following the lateral section 71a of cam track 69a, the upwardly extending tines 68a extend up through the spaces between tines 61a of spinner 49a, and when following the dip section 72a of cam track 69a, the upwardly extending tines 68a are withdrawn from between tines 61a of spinner 49a.

Spinner 49a is surrounded by an arcuate housing 75a which is supported from bearing sleeve 46a and frame 11 by means of support beams 76a, 78a, 79a, 80a and 81a. Housings 75a and 75b are also connected to each other, intermediate frame 11, at 82. Housing 75a extends around spinner 49a, approximately 270° and then extends tangentially from spinner 49a at 84a. Extensions 84a and 84b define a discharge opening 85 at the rear of housings 75a and 75b.

A center divider 86 extends over the center of the upper portion of conveyor mechanism and functions to divide the peanut plants into two rows or ribbons of plants as they travel over the conveyor mechanism. An ejector shield 88a is connected to bearing sleeve 46a, and extends first in a spiral direction and then in a tangential direction away from bearing sleeve 46a, parallel to extensions 84a and 84b of housing 75a and 75b. Ejector shields 88a and 88b are connected to each other at the center of the inverter mechanism 48, and a divider 89 extends from the junction of ejector shields 88a and 88b rearwardly of the inverter mechanism. An arcuate cover 87 is supported at its ends by frame 11 and extends over and partially about driven shaft 38.

OPERATION

Figure 3:
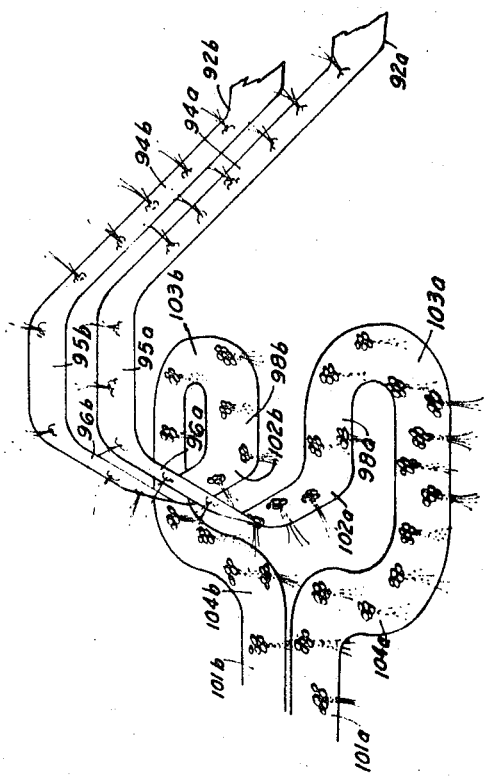
FIG. 3 is a schematic perspective view showing the manner in which the peanut plants are processed by the digger, shaker inverter.

When operating the rigger, shaker inverter apparatus, a tractor is connected to the three-point hitch 14 and its power output shaft is connected to transmission 32. The tractor pulls the apparatus so that plows 16 penetrate the earth, beneath adjacent rows of peanut plants. Transmission 32 functions to drive sheaves 36, which drive endless belt 40, which powers sheave 39 of driven shaft 38. Rotation of driven shaft 38 causes its sprockets 24 to rotate and power endless conveyor chains 26, at each side of inner frame 21. Driven shaft 38 is driven in the direction as indicated by arrow 90 (FIG. 1) and conveyor bars 30 travel in the direction indicated by arrows 91 (FIG. 1). As the spikes or tines 31 of conveyor bars 30 approach the ground, they impale the plants removed from the earth by the plows and carry the plants over the conveyor mechanism, first in an upward direction and then in a rearward direction. The movement of the peanut plants in this manner by the conveyor mechanism tends to shake the plants to remove the dirt from the roots of the plants as the apparatus travels over the ground. The direction of movement of the plants is illustrated in FIG. 3, where it can be seen that the plants are removed from the earth at 92a and 92b, and carried in an upward direction 94a and 94b, then in a rearward direction 95a and 95b, whereupon they are allowed to drop onto the inverter mechanism 48 at the infeed areas 102a and 102b. When the plants drop onto the inverter mechanism 48, the spinners 49a and 49b move the plants in an arcuate path. The plants are first moved in a forward direction 98a and 98b at the infeed areas 102a and 102b, and then are moved throughout the central portions 103a and 103b of their arcuate travel, until they reach the outfeed areas 104a and 104b where they are urged off the spinners by ejector shields 88a and 88b, whereupon they are deposited on the ground at 101a, 101b.

When the plants travel over the conveyor mechanism, they are substantially in the foliage-up position in which they are dug, and as they wall from the conveyor mechanism toward the infeed areas 102a and 102b of the inverter mechanism, the foliage topples over the rear of the apparatus while the nuts and roots are oriented toward the forward portion of the apparatus. When the plants engage the spinners 49a and 49b, the tines 61a and 61b function to invert the plants so that the foliage of the plants is essentially oriented in a downward direction while the roots and nuts are oriented in an upward direction. The inverting of the plants in this manner is assisted by the intertwined relationship of the vines which form a ribbon which is pulled forward by the tines 61a and 61b so that the plants follow a regular pattern. Disappearing tine mechanisms 64a and 64b insure that the plants do not tumble about on spinners 49a and 49b, and that the plants are carried around in an orderly manner by the spinners in their planned paths of travel. As is shown in FIG. 3, the plants, which are illustrated as travelling in ribbon form, drop from the conveyor mechanism at 96, and first travel in a worward direction on the spinners at 98a and 98b at infeed areas 102a and 102b, and then around on the spinners 49a and 49b. The disappearing tine mechanisms are lowered to release the plants in the outfeed areas 104a and 104b and the ejector shields urge the plants toward opening 85, whereupon the plants re deposited onto the ground surface at 101.

The spacing of tines 61a and 61b of spinners 49a and 49b allows any dirt shaken from the roots of the plants when the plants are deposited onto spinners 49a and 49b from the conveyor mechanism to fall to the ground beneath the inverter mechanism. Thus the plants are deposited onto the ground in a nuts-up position with a minimum amount of dirt attached to the roots and nuts of the plants. The plants are uprooted from adjacent rows and travel over the conveyor mechanism in separate rows or ribbons of plants, are deposited onto spinners 49a and 49b as separate ribbons of plants, and are deposited onto the ground in essentially a single row of plants. Thus the plants are left to dry with the nuts exposed and with the plants of adjacent rows in the field deposited in a single row for convenience in retrieving the plants and picking the nuts therefrom.

Spinner drive sheaves 50a and 50b and sheaves 52a and 52b on spinner drive shafts 56a and 56b, being variable pitch sheaves, can be adjusted to vary the speed of rotation of spinners 49a and 49b with relation to the speed of operation of the conveyor mechanism. Generally, the speed of spinners 49a and 49b is adjusted so that the plants travel through inverter mechanism 48 at substantially the same speed at which they travel over the conveyor mechanism.

Doffing mechanism 42 on driven shaft 38 functions to urge the plants away from conveyor bars 30 as the plants reach the vicinity of inverter mechanism 48. Doffing bars 45 protrude between conveyor bars 30 so that the tines 31 of the conveyor bars will not be entangled in the roots and foilage of the plants when traveling over their return flights. Arcurate housing 87 guides the plants around the end of the conveyor mechanism toward spinners 49a and 49b and prevents the doffing mechanism from throwing the plants beyond ejector shields 88a and 88b.

It will be obvious to those skilled in the art that many variations may be made in the embodiment chosen for the purpose of illustrating the present invention without departing from the scope thereof as defined by the appended claims.

What is claimed as invention is:

1. Apparatus for harvesting peanuts comprising a shaker including conveyor means for retrieving and elevating peanut laden plants, an inverter mechanism connected to said shaker and comprising at least one rotatable member positioned behind the shaker and rotatable about a vertical axis said rotatable member including means for receiving peanut laden plants from said shaker and moving the plants through an arcurate path first toward said shaker and then away from said shaker, and means for urging the plants off said rotatable member.

2. The invention of claim 1 wherein said rotatable member includes a plurality of tines extending in a plane generally normal to the axis of rotation and curved rearwardly from their normal direction of rotation.

3. The invention of claim 2 and further including a plurality of holding means movable to a position between said tines to hold the plants on said tines and retractable from between said tines.

4. The invention of claim 3 wherein said holding means are rotatable with said tines and extend between said tines and are retracted from between said tines during prescribed portions of the path of rotation of said tines.

5. In apparatus for harvesting peanuts including a plow movable through the ground to unearth peanut plants and a conveyor for retrieving the plants from the ground and shaking the plants, the improvement therein of inverting apparatus for receiving the plants from the conveyor comprising an infeed area and an outfeed area, at least one member rotatable about a generally vertical axis through said infeed area in a direction generally toward the plow and then through said outfeed area generally away from said plow.

6. The invention of claim 5 wherein said rotatable member includes a plurality of generally horizontally disposed curved tines.

7. The invention of claim 6 and further including members rotatable with said tines, means for positioning said members between at least some of said tines as they pass through said infeed area and for removing said members from between said tines as they pass through said outfeed area.

8. Apparatus for harvesting peanuts comprising:
plow means movable along a row of peanut laden plants for unearthing the plants,
conveyor means movable with said plow means for elevating the plants and shaking dirt from the plants,
inverting means movable with said plow means for receiving the plants from said conveyor means and moving the plants in an arc, first generally in the direction of movement of said plow means and subsequently in a direction substantially opposite from that of said plow means so as to deposit the plants on the ground in inverted position.

9. The invention of claim 8 wherein said inverting means comprises a platform member rotatable about a generally vertically extending axis.

10. The invention of claim 9 wherein said platform member comprises a plurality of curved tines.

11. The invention of claim 10 wherein said tines are curved away from their direction of rotation.

12. The invention of claim 11 and further including holding means positionable between at least some of said tines as they move through a first area and retractable from between said tines as they move through a second area.

13. A method of harvesting peanuts comprising:
unearthing the plants from adjacent rows of plants,
elevating and shaking the plants of each row,
depositing the plants of each row onto generally horizontal surfaces,
moving the plants of each row in opposite directions through an arc, inverting the plants of each row, and depositing the plants of each row in a single row on the ground in inverted position.

14. A method of harvesting peanuts comprising:
unearthing peanut laden plants from a row,
elevating and shaking the plants,
depositing the plants onto a generally horizontal surface,
rotating the surface to carry the plants through an arc,
inverting the plants, and depositing the plants on the ground in inverted position.

References Cited

UNITED STATES PATENTS

| | | | |
|---|---|---|---|
| 749,512 | 1/1904 | Anderson | 56—345 |
| 2,751,745 | 6/1956 | Magee | 56—372 |
| 2,997,114 | 8/1961 | Hines | 171—116 |
| 3,024,849 | 3/1962 | Gregory | 171—61 |
| 3,083,776 | 4/1963 | Carter et al. | 171—101 |
| 3,260,314 | 7/1966 | Edwards | 171—101 |

ANTONIO F. GUIDA, Primary Examiner

U.S. Cl. X.R.

171—116